Jan. 14, 1936.    H. E. GRAU    2,027,376

SAFETY HOOK

Filed Aug. 10, 1934

Inventor

Herbert E. Grau

By Lyon Lyon

Attorneys

Patented Jan. 14, 1936

2,027,376

UNITED STATES PATENT OFFICE 2,027,376

SAFETY HOOK

Herbert E. Grau, Los Angeles, Calif., assignor to Byron Jackson Co., Los Angeles, Calif., a corporation of Delaware Application August 10, 1934, Serial No. 739,255

9 Claims. (Cl. 24—232)

This invention relates to safety hooks and, while the invention is applicable to hooks used for any specific purpose in lifting heavy loads, it is particularly useful when applied to the construction of safety hooks such as used in handling well tubing in oil well derricks.

Hooks of this kind are commonly called tubing hooks and are usually provided with a safety latch to prevent the object being hoisted from becoming dislodged from the hook. This latch is in the form of a bar latched across the opening into the hook.

One of the objects of the invention is to provide a hook of this kind with a latch bar which is simple in construction and which can be readily controlled; also to provide a hook of this type in which the safety latch cannot be opened while the hook is on the load.

A further object of the invention is to provide a hook of this kind having a latch which will close and lock automatically when the hook picks up the load; also to construct the hook in such a way that when the latch is in position to close the hook, it will operate to support a portion of the load on the hook, thereby greatly increasing the strength of the hook.

Further objects and advantages of the invention will appear hereinafter.

The invention consists in novel parts and combinations of parts to be described hereinafter, all of which contribute to produce an efficient safety hook.

A preferred embodiment of the invention is described in the following specification, while the broad scope of the invention is pointed out in the appended claims.

Figure 1:
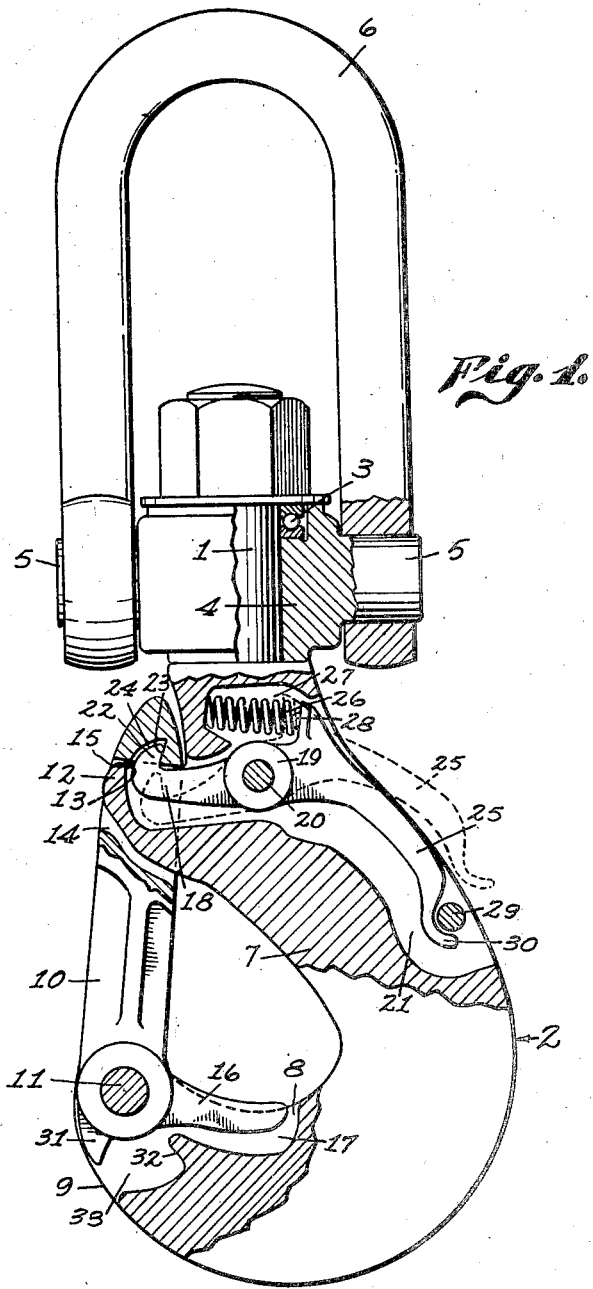
Figure 1 is a side elevation and partial section through a hook illustrating an embodiment of my invention in which the upper end of the latch arm has an opening or eye to interlock with an abutment or lug on the hook.

Referring more particularly to the parts, and especially to Figure 1, 1 indicates the shank of the hook 2, which shank is supported to swivel on a swivel bearing 3 on the upper side of a trunnion body 4 having diametrically opposite trunnions 5 supported on the forks of a bail 6, which bail is supported from a cable or chain when in use.

The hook 2 comprises a body 7 having a bight 8 at its lower portion where the bill 9 of the hook projects forwardly and upwardly. On this bill 9, and preferably at its end, I provide means for supporting a locking bar 10, said locking bar being carried on a crosspin 11. The upper portion of the hook body is provided with an outwardly projecting abutment or lug 12 that projects forwardly and when the locking bar 10 is in its upright or locking position it engages over this abutment. The hook is preferably constructed so that the locking bar fits against the upper face 13 of this abutment. In the hook illustrated in Figure 1, the locking bar 10 has a central opening 14 which receives the abutment 12 and the upper face 15 of this opening seats upon the face 13. In this way, any strain on the bill of the hook will be resisted by developing tension in the locking bar 10 and this relieves the body of the hook of part of the tension that would ordinarily be developed in the body of such a hook.

The locking bar 10 is provided with means extending inwardly at the upper side of the bill of the hook to prevent the locking bar from becoming displaced as long as there is a load on the hook. For this purpose I prefer to provide the locking bar 10 with an integral finger 16 that projects inwardly along the upper side of the bill of the hook and this finger is preferably received in a recess 17 formed in the upper side of one bill 9, (Figure 1).

The hook is preferably provided with latching means for latching the locking bar in its upright position, in which it closes the hook. In the embodiment of the invention shown in Figure 1, this latching means or latch, comprises a forwardly projecting arm 18 having a hub 19 that is mounted to rock on a crosspin 20. This latching means, or latch, is mounted in a recess or chamber 21 that extends in from the back of the hook and also extends into the abutment 12 so that the forward portion of this recess gives clearance for the arm 18 of the latch. This arm 18 has an end hook 22 which can engage a shoulder 23 on the upper end of the locking bar. In the present instance this shoulder forms the rear face of a recess 24 formed in the face 15 and this recess conforms substantially to the outline of the end hook 22 of the latch bar 18.

The latch has a rearwardly projecting operating lever 25 which is received in the rear portion of the recess 21. The latch bar 18 is normally constrained toward its latching position by means of a coil spring 26 which, in the present instance, is located in a spring chamber 27 located above the chamber 21 and communicating with the same. The rear end of this spring thrusts against a lug 28 projecting upwardly from the upper side of the lever 25. If desired, a removable pin 29 may be provided extending across the recess 21 at the back of the hook and in a position to be engaged by a tail 30 on the lever 25. If this pin is put in place, the lever 25 cannot be operated to release the locking arm.

If the pin 29 is not used, or has been removed, the operator of the hook can reach into the recess 21 and seize the lever 25 with his fingers so as to pull it upwardly, thereby releasing the locking bar 10. As soon as the weight is taken off the hook, the link or eye carried in the hook for supporting the tubing, can be swung out of the hook, displacing the locking bar 10 toward the left as this occurs. The hub of the locking bar 10 is preferably provided with a dog 31 to engage a stop shoulder 32 located at a recess 33 in the forward end of the bill. This stop holds the locking bar in a depressed position and leaves the opening into the hook unobstructed.

In the construction of this hook, the finger 16 should be depressed sufficiently to insure that it will not take any of the weight of the link that is supported in the hook. It is merely held in a depressed position by the link on the hook.

Figure 2:
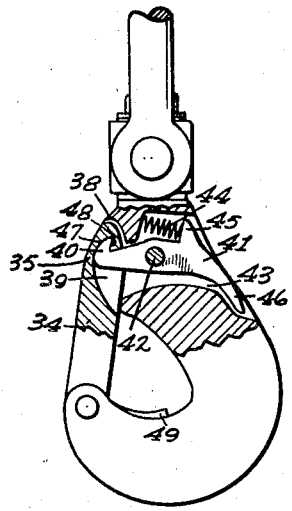
Figure 2 is a side elevation of a hook upon a reduced scale and illustrating another embodiment of the invention in which the upper end of the latch bar is formed with a T head received in a correspondingly shaped socket in the hook.
Figure 3:
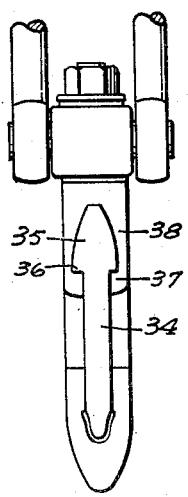
Figure 3 is a front elevation and partial section of the hook illustrated in Figure 2.

In the embodiment of the invention illustrated in Figures 2 and 3, the locking arm or bar 34 is provided with a head 35 at its upper end so that shoulders 36 are formed as projecting abutments on the head to engage with corresponding shoulders 37 in a socket 38 formed in the forward side of the hook (see Fig. 3). When the locking arm is in its closed position, these shoulders engage with each other so that any tension on the hook will be partly borne by the locking bar.

The inner face of the head 35 is provided with a recess 39 into which the end hook 40 of the latch 41 extends. This latch is mounted on a pivot or pin 42 similar to the pin 20 and the latch is received in a recess or chamber 43 formed in the upper portion of the body of the hook. A spring 44 is mounted preferably as illustrated so that it extends in a substantially horizontal direction and so as to thrust against a lug 45 on the upper side of the latch. On account of the horizontal position of the spring, a jar to the hook in a vertical plane will not tend to compress the spring and release the hook accidentally. The rear end of the latch 41 is formed into a handle 46 at the back of the hook, and this handle is preferably recessed down into the back of the hook.

The end hook 40 is provided with an inclined edge 47 at its tip which enables it to snap into place and engage a shoulder 48 in the recess 39 that corresponds to the shoulder 23. This locking bar or arm 34 is also provided with a rigid finger 49 similar to the finger 16 and which performs the same function.

The upper end of the locking bars in both embodiments of the invention are constructed with inclined outer faces like the face 46 of Figure 2 so that when the hook is dragged along or when it is swinging about overhead, there is little tendency for the locking arm to be engaged by any part which might tend to pull the locking bar open.

The end hook 24 of the latch arm 18 is preferably formed with an inclined forward edge similar to the inclined edge 47 of hook 40, that enables the latch arm to snap into locking position when the locking arm is swung up into place. The locking arm 18 will be swung up in this way when the link coming into the bight 8 of the hook, depresses the finger 16.

It is understood that the embodiment of the invention described herein is only one of the many embodiments this invention may take and I do not wish to be limited in the practice of the invention, nor in the claims, to the particular embodiments set forth.

What I claim is:

1. A safety hook comprising a hook-shaped body having an upwardly projecting bill, said body having an outwardly projecting abutment above the opening into the hook, a locking bar pivotally attached to the bill, extending upwardly across the opening of the hook and engaging the upper face of the abutment so that the said locking bar supports a portion of the load on the hook, said locking bar capable of swinging down on its pivot to leave the opening into the hook unobstructed, and a latch pivotally mounted on the body of the hook and having means for engaging the upper end of the locking bar to hold the same in engagement with the abutment.

2. A safety hook comprising a hook-shaped body having an upwardly projecting bill, said body having an outwardly projecting abutment above the opening into the hook, a locking bar pivotally attached to the bill, extending upwardly across the opening of the hook and engaging the upper face of the abutment so that the said locking bar supports a portion of the load on the hook, a stop for supporting the locking bar in a depressed position to maintain the hook open, a latch pivotally mounted on the body of the hook and having means for engaging the upper end of the locking bar to hold the same in engagment with the abutment, and a spring associated with the latch for normally urging the same in a direction to engage the end of the locking bar.

3. A safety hook comprising a hook-shaped body having an upwardly projecting bill, said body having an abutment above the opening into the hook, a locking arm pivotally attached to the bill, extending upwardly across the opening of the hook and engaging the upper face of the abutment so that the said locking bar supports a portion of the load on the hook, said locking arm capable of swinging down on its pivot to leave the opening into the hook unobstructed, and a latch pivotally mounted on the body of the hook and having means for engaging the upper end of the locking bar to hold the same in engagement with the abutment, said locking bar having an integral finger projecting inwardly at the upper side of the bill so as to be engaged by a link hanging on the hook so that the link will maintain the locking bar in engagement with the abutment.

4. A safety hook comprising a hook-shaped body having an upwardly projecting bill, said body having an abutment above the opening into the hook, a locking bar pivotally attached to the bill, extending upwardly across the opening of the hook and engaging the upper face of the abutment so that the said locking bar supports a portion of the load on the hook, and a latch pivotally mounted on the body of the hook and having means for engaging the upper end of the locking bar to hold the same in engagement with the abutment, said locking bar having an integral finger projecting inwardly at the upper side of the bill so as to be engaged by a link hanging on the hook to maintain the locking bar in engagement with the abutment, a latch mounted on the body having an arm extending toward the upper end of the locking bar, with a hook engaging the locking bar to retain the same on the abutment, said latch having an operating lever extending toward the rear side of the hook body.

5. A safety hook comprising a hook-shaped body having an upwardly projecting bill, said body having an abutment above the opening into the hook, a locking bar pivotally attached to the bill, extending upwardly across the opening of the hook and engaging the upper face of the abutment so that the said locking bar supports a portion of the load on the hook, and a latch pivotally mounted on the body of the hook and having means for engaging the upper end of the locking bar to hold the same in engagement with the abutment, the upper side of the bill of the hook having a recess therein, and said locking bar having a finger rigid therewith and projecting along said recess so that the upper side of the finger is engaged by a link hanging on the hook, thereby enabling the link to maintain the locking bar in engagement with the abutment.

6. A safety hook comprising a hook-shaped body with an upwardly projecting bill, said body having an outwardly projecting abutment above the hook opening, a locking bar pivotally attached to the bill, extending upwardly therefrom and having a shoulder at its upper end engaging the abutment and with the lower face of said shoulder engaging the upper face of the abutment so that a portion of the load on the hook is borne by the locking bar, a latch pivotally mounted on said said body and having an arm projecting toward the locking bar, said latch having an end hook for engaging the locking bar, said locking bar having a shoulder to engage the end hook, a spring for urging the latch in a direction to engage the locking bar, and an operating lever on the latch extending toward the rear side of said body.

7. A safety hook comprising a hook-shaped body with an upwardly projecting bill, said body having an outwardly projecting abutment above the hook opening, a locking arm pivotally attached to the bill, extending upwardly therefrom and having a shoulder at its upper end engaging the abutment and with the lower face of said shoulder engaging the upper face of the abutment so that a portion of the load on the hook is borne by the locking bar, a latch pivotally mounted on the said body and having an arm projecting toward the locking bar, said latch having an end hook for engaging the locking bar, said locking bar having a recess in the upper end thereof to engage the hook end, a spring for urging the latch in a direction to engage the hook end in said recess, and an operating lever on the latch extending toward the rear side of said body.

8. A safety hook comprising a hook-shaped body having an upwardly projecting bill, said body having an abutment above the opening into the hook, a locking bar pivotally attached to the bill extending upwardly across the opening of the hook and engaging the abutment, said abutment and the body of the hook having a latch chamber formed therein, a latch received in said latch chamber and having an end-hook adjacent the upper end of the locking arm, said locking arm having a recess in the upper end thereof for engaging the end-hook to retain the locking bar on the abutment, a spring in the latch-chamber engaging the latch to urge the same in a direction to engage the locking bar, said latch having an operating lever located at the back of the hook, said locking bar having a finger rigid therewith projecting inwardly along the bill of the hook to be engaged by a link hanging on the hook.

9. A safety hook comprising a hook-shaped body having an upwardly projecting bill, said body having an outwardly projecting abutment above the opening into the hook, a locking bar pivotally attached to the bill, extending upwardly across the opening of the hook and engaging the upper face of the abutment so that the said locking bar supports a portion of the load on the hook, said locking bar capable of swinging down on its pivot to leave the opening into the hook unobstructed, a latch pivotally mounted on the body of the hook and having means for engaging the upper end of the locking bar to hold the same in engagement with the abutment, and a coil spring mounted in the hook urging the latch toward its latching position, and having its axis disposed in a substantially horizontal position when the hook is hanging in a vertical position.

HERBERT E. GRAU.